US010148346B1

(12) United States Patent
Liu et al.

(10) Patent No.: US 10,148,346 B1
(45) Date of Patent: Dec. 4, 2018

(54) SYSTEMS AND METHODS FOR DETERMINING A FREQUENCY BAND FOR WIRELESS BACKHAUL

(71) Applicant: Sprint Spectrum LP, Overland Park, KS (US)

(72) Inventors: Chunmei Liu, Great Falls, VA (US); Hemanth Pawar, Brambleton, VA (US); Krishna Sitaram, Chantilly, VA (US); Pratik Kothari, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 181 days.

(21) Appl. No.: 15/228,649

(22) Filed: Aug. 4, 2016

(51) Int. Cl.
*H04B 7/26* (2006.01)
*H04W 16/18* (2009.01)
*H04L 5/00* (2006.01)
*H04W 88/04* (2009.01)

(52) U.S. Cl.
CPC ........... *H04B 7/2606* (2013.01); *H04L 5/001* (2013.01); *H04W 16/18* (2013.01); *H04W 88/04* (2013.01)

(58) Field of Classification Search
CPC ... H04B 7/2606; H04B 7/15528; H04L 5/001; H04L 5/003; H04L 5/0037; H04L 5/0039; H04L 5/0041; H04L 2012/5631; H04L 2012/563; H04L 1/0001; H04W 16/18; H04W 88/04; H04W 72/04; H04W 72/0453; H04W 28/00; H04W 28/0231; H04W 28/0236; H04W 28/0247; H04W 28/0268

See application file for complete search history.

(56) References Cited

U.S. PATENT DOCUMENTS

| | | | |
|---|---|---|---|
| 9,622,242 B1 * | 4/2017 | Pawar | H04W 72/0446 |
| 9,680,538 B2 * | 6/2017 | Xia | H04B 7/0617 |
| 9,762,304 B1 * | 9/2017 | Sitaram | H04B 7/0617 |
| 2009/0093221 A1 * | 4/2009 | Pan | H04B 7/0417 |
| | | | 455/101 |
| 2009/0209264 A1 * | 8/2009 | Yang | H04L 1/0026 |
| | | | 455/452.1 |
| 2011/0028148 A1 * | 2/2011 | Lee | H04L 5/003 |
| | | | 455/435.2 |
| 2013/0070664 A1 * | 3/2013 | Nagata | H04B 7/15542 |
| | | | 370/315 |

(Continued)

*Primary Examiner* — Warner Wong

(57) ABSTRACT

Exemplary embodiments described herein include systems, methods, and nodes for determining a frequency band for wireless backhaul. It may be determined that a utilization of a frequency band used for backhaul between a relay wireless device and an access node meets a criteria. An overhead may be calculated for a set of frequency bands available for use as backhaul between the relay wireless device and the access node, wherein the calculated overhead for a particular one of the set of frequency bands is based on at least one of a number of wireless devices that use the particular frequency band for carrier aggregation and a number of wireless devices that receive a beamformed signal over the particular frequency band. One of the set of frequency bands may be selected based on the calculated overhead. And the relay wireless device may be instructed to communicate wireless backhaul to the access node over the selected frequency.

20 Claims, 8 Drawing Sheets

(56) References Cited

U.S. PATENT DOCUMENTS

| | | | | |
|---|---|---|---|---|
| 2013/0237208 A1* | 9/2013 | Vujcic | ............... | H04B 7/15507 455/418 |
| 2014/0185496 A1* | 7/2014 | Wolf | .................... | H04W 92/20 370/294 |
| 2014/0321346 A1* | 10/2014 | Chung | ................. | H04L 5/0035 370/311 |
| 2015/0256316 A1* | 9/2015 | Seo | ...................... | H04L 1/1861 370/329 |
| 2016/0315672 A1* | 10/2016 | Patwardhan | ........... | H04B 7/024 |
| 2017/0264345 A1* | 9/2017 | Panah | .................. | H04B 7/0417 |
| 2017/0324455 A1* | 11/2017 | Soriaga | ................ | H04W 76/10 |

\* cited by examiner

SYSTEMS AND METHODS FOR DETERMINING A FREQUENCY BAND FOR WIRELESS BACKHAUL

TECHNICAL BACKGROUND

As wireless networks evolve and grow, there are ongoing challenges in providing high-quality service to increasing numbers of wireless devices or user equipment (UE) in various coverage areas of a wireless network. One approach to improving service quality and coverage is to designate a wireless device as a relay node or relay wireless device for relaying communication between a base station or access node (donor access node), and an end-user wireless device. Relay wireless devices may be used at the edge of a coverage area of an access node to improve coverage and/or service, as well as in crowded areas having a high number of other wireless devices to increase the available throughput to the end-user wireless devices being relayed. However, it may be beneficial to manage resource assignments for relay wireless devices at an access node (donor access node) such that wireless congestion can be mitigated and to minimize the impact of the relay wireless devices on normal wireless devices serviced by the access node.

OVERVIEW

Exemplary embodiments described herein include systems, methods, and nodes for determining a frequency band for wireless backhaul. It may be determined that a utilization of a frequency band used for backhaul between a relay wireless device and an access node meets a criteria. An overhead may be calculated for a set of frequency bands available for use as backhaul between the relay wireless device and the access node, wherein the calculated overhead for a particular one of the set of frequency bands is based on at least one of a number of wireless devices that use the particular frequency band for carrier aggregation and a number of wireless devices that receive a beamformed signal over the particular frequency band. One of the set of frequency bands may be selected based on the calculated overhead. And the relay wireless device may be instructed to communicate wireless backhaul to the access node over the selected frequency.

DETAILED DESCRIPTION

In an embodiment, methods and system are described for determining a frequency band for wireless backhaul. For example, a relay wireless device may connect a small cell to an access node such that the relay wireless device relays backhaul traffic to and from the access node and small cell. However, relay wireless devices may present a different set of challenges from a standard wireless device. For example, when a traffic load at the small cell increases suddenly, the backhaul traffic may similarly increase and the frequency band used to communicate between the relay wireless device and the access node may become congested. Accordingly, it may be beneficial to select a frequency band for relay wireless devices based on congestion parameters. In some embodiments, a calculated overhead may be considered when selecting a frequency band to be used for wireless backhaul. For example, overhead caused by carrier aggregation and/or beamformed signals over various frequency bands may be calculated, and a frequency band may be selected for wireless backhaul based on this calculated overhead. In some embodiments, selecting a frequency band for wireless backhaul based on calculated overhead may reduce the risk on congestion.

Figure 1:
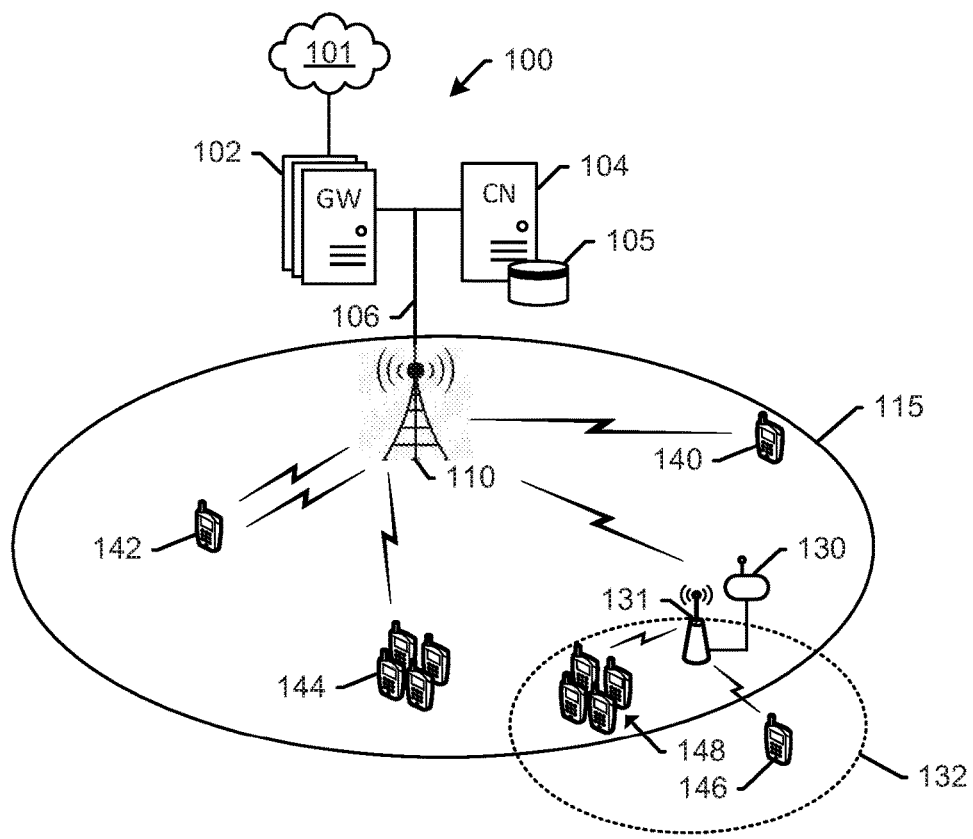
FIG. 1 depicts an exemplary system for determining a frequency band for wireless backhaul.

FIG. 1 depicts an exemplary system 100 for determining a frequency band for wireless backhaul. System 100 may comprise a communication network 101, gateway node 102, controller node 104, database 105, communication link 106, access node 110, relay wireless device 130, wireless devices 140, 142, 144, 146, and 148, which may comprise end-user wireless devices, and coverage areas 115 and 132. In an embodiment, access node 110 provides wireless services to wireless devices 140, 142, and 144, and the illustrated relay access node that comprises a combination of relay wireless device 130 and small cell 131, which may comprise a relay access point or node. For instance, small cell 131 may provide wireless services to wireless devices 146 and 148, which may comprise end-user wireless device, and relay wireless device 130 may access communication network 101 via access node 110. Consequently, access node 110 may be referred to as a donor access node. Relay wireless device 130 is thus configured to relay services from access node 110 to wireless devices 146 and 148.

In an embodiment, to achieve this, relay wireless device 130 may comprise a customer premise equipment (CPE), which may be any stationary LTE wireless device having a stronger computational & RF capability versus standard wireless devices, as well as a directional antenna and a dedicated power supply. Relay wireless device 130 also may be communicatively coupled to small cell 131. Small cell 131 may include a mini-macro, picocell, femtocell, or the like that are capable of providing a wireless access point for wireless devices 146 and 148, of which wireless devices 148 comprise a cluster of wireless devices. Access node 110 is illustrated as having coverage area 115, small cell 131 is illustrated as having coverage area 132. Relay wireless device 130 is located within coverage area 115, as are wireless devices 140, 142, and 144. Wireless device 146 is located outside of coverage area 115 but within coverage area 132 of small cell 131 and wireless devices 148 are located within both coverage areas 115 and 132. In an embodiment, wireless devices 148 may access network services using the combination of relay wireless device 130 and small cell 131, rather than overload access node 110, which may be serving numerous other devices, such as wireless devices 140, 142, and 144. Moreover, wireless device 146 that is outside coverage area 115 may access network services from access node 110 by virtue of being connected to relay wireless device 130 via small cell 131.

In an embodiment, relay wireless device 130 can be configured to function as one or more of a layer 1 (L1), layer 2 (L2), or layer 3 (L3) relay. A layer 1 relay functions as a booster or repeater. In other words, a layer 1 relay device performs an amplify and forward (AF) function. RF signals received from access node 110 are amplified and transmitted by relay wireless device 130 to one or more of wireless devices 146 and 148. Likewise, RF signals received from wireless devices 146 and 148 are amplified and transmitted by relay wireless device 130 to access node 110. Alternatively or in addition, a layer 2 relay device performs a decode and forward (DF) function. RF signals received from access node 110 are demodulated and decoded, then encoded and modulated again before being transmitted by relay wireless device 130 to one or more of wireless devices 146 and 148. Likewise, RF signals received from one or more of wireless devices 146 and 148 are demodulated and decoded, then encoded and modulated again before being transmitted by relay wireless device 130 to access node 110. Alternatively or in addition, a layer 3 relay device also performs a decode and forward function. However, a layer 3 relay device also performs additional processing (such as ciphering and/or data concatenation/segmentation/resassembly). In other words, relay wireless device 130 may perform demodulation and decoding of the received RF signals (either uplink or downlink), processing of the received data, then encode, modulate, and transmit the data to one or more of wireless devices 146 and 148.

Relay wireless device 130 and wireless devices 140, 142, 144, 146 and 148 may be any device, system, combination of devices, or other such communication platform capable of communicating wirelessly with access node 110 using one or more frequency bands deployed by access node 110. Relay wireless device 130 and wireless devices 140, 142, 144, 146 and 148 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible. In some embodiments, relay wireless device 130 includes stronger computational & radiofrequency capabilities than an average wireless device, as well as a directional antenna, and dedicated power supply, so that they can sustain an over-the-air backhaul link for wireless devices 146 and 148 that attach to small cell 131.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by relay wireless device 130 and wireless devices 140, 142, 144, 146, and 148 may be. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication link 106 can use various communication media, such as air, space, metal, optical fiber, or some other signal propagation path—including combinations thereof. Communication link 106 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Communication link 106 may include S1 communications links. Other wireless protocols can also be used. Communication link 106 can be a direct link or might include various equipment, intermediate components, systems, and networks. Communication link 106 may comprise many different signals sharing the same link Gateway nodes 102 can be any network node or plurality of network nodes that are configured to interface with other network nodes using various protocols. Gateway nodes 102 can communicate user data over system 100. Gateway nodes 102 can be standalone computing devices, computing systems, or network components, and can be accessible, for example, by a wired or wireless connection, or through an indirect connection such as through a computer network or communication network. For example, gateway nodes 102 can include a serving gateway (S-GW) and/or a public data network gateway (P-GW), etc. Gateway nodes 102 can include a relay S-GW/P-DW combination for providing gateway services to relay wireless device 130, as well as a wireless device S-GW/P-DW combination for providing gateway services to one or more of wireless devices 140, 142, 144, 146, and 148. In embodiments, data packets such as voice over IP (VoIP) data packets may be routed from one or more of wireless devices 142, 144, 146, and 148 to a relay S-GW/P-GW first, and then to a UE S-GW/P-GW. However, persons having ordinary skill in the art would recognize that gateway nodes 102 are not limited to any specific technology architecture, such as Long Term Evolution (LTE), and can be used with any network architecture and/or protocol.

Each of gateway nodes 102 can comprise a processor and associated circuitry to execute or direct the execution of computer-readable instructions to obtain information. Gateway nodes 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway nodes 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing access node characteristics. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Access node 110 can be any network node configured to provide communication between relay wireless device 130 and/or wireless devices 140, 142, 144, 146, and 148, and communication network 101. Access node 110 can be a macrocell access node such as a base transceiver station, a radio base station, an eNodeB device, or an enhanced eNodeB device, or the like. In an exemplary embodiment, a macrocell access node can have a coverage area 115 in the range of approximately five kilometers to thirty five kilometers and an output power in the tens of watts.

Small cell 131 may comprise a small access node, microcell access node, a picocell access node, a femtocell access node, or the like such as a home NodeB or a home eNodeB device. A coverage area for a small cell may be smaller than the overage area for a macro cell (e.g., access node 110). Moreover, it is noted that while access node 110 and small cell 131 are illustrated in FIG. 1, any number of access nodes and/or small cells can be implemented within system 100.

Access node 110 and small cell 131 can comprise a processor and associated circuitry to execute or direct the execution of computer-readable instructions to obtain information. Access node 110 and small cell 131 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access node 110 and small cell 131 can receive instructions and other input at a user interface. Access node 110 communicates with gateway nodes 102 and controller node 104 via communication link 106. Operations performed by one or all of access node 110 and small cell 131 are further described herein with reference to FIGS. 6 and 7.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2:
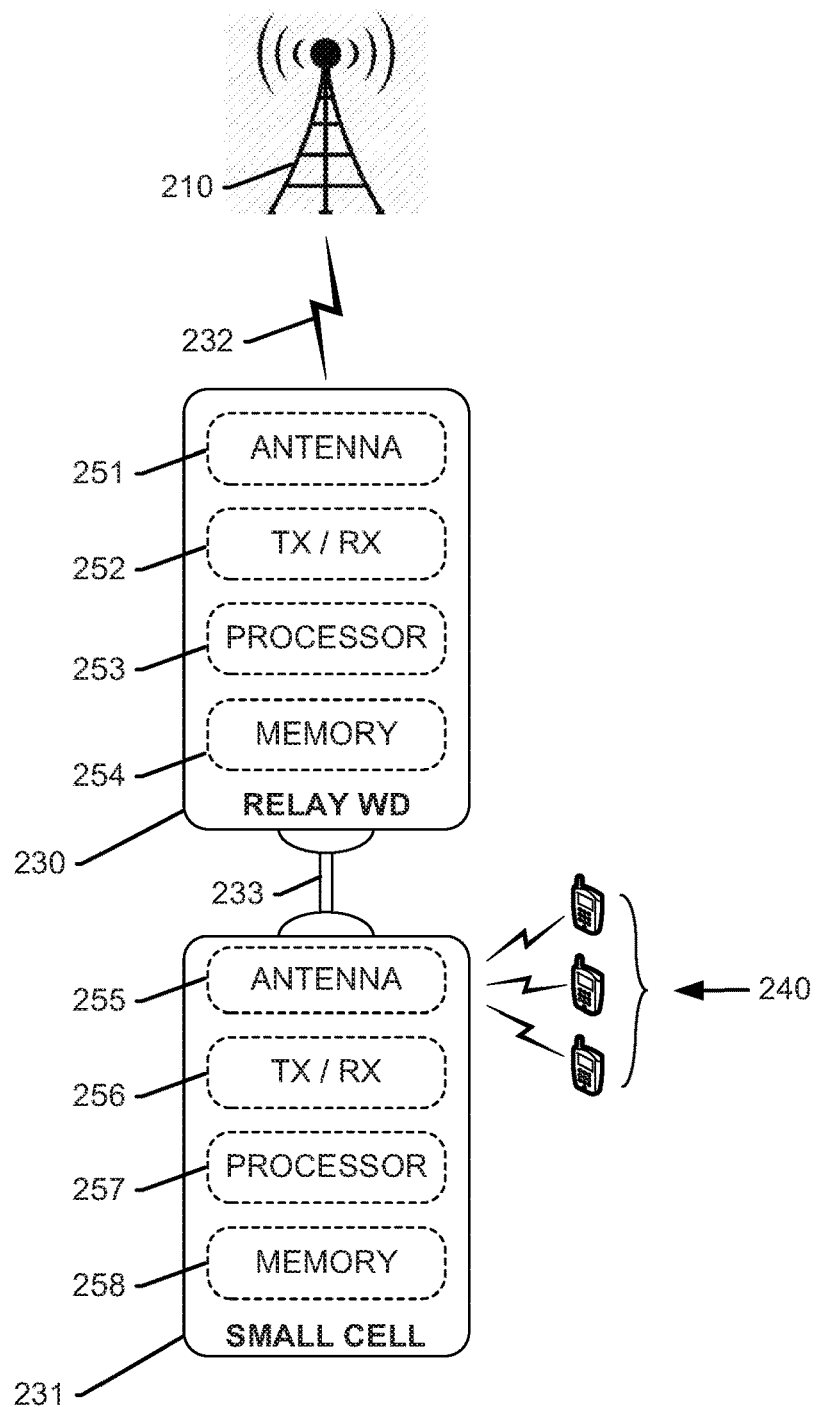
FIG. 2 depicts an exemplary relay wireless device coupled to a small cell.

FIG. 2 depicts an exemplary relay wireless device 230, or relay user equipment (UE), coupled to a small cell 231, which may comprise a picocell. Relay wireless device 230 is illustrated as comprising an antenna 251 for direct (e.g., unrelayed) communication with access node 210 via communication link 232, a transceiver 252, a processor 253, and a memory 254 for storing instructions that enable relay wireless device 230 to perform operations described herein. In some embodiments, relay wireless device 230 is referred to as a customer premise equipment (CPE), which includes any stationary LTE wireless device having a stronger computational & RF capability versus standard wireless devices, as well as a directional antenna and a dedicated power supply, enabling relay wireless device 230 to efficiently provide resources to wireless devices 240, which may comprise end-user wireless devices, via small cell 231. Consequently, small cell 231 may be co-located with relay wireless device 230, and is connected to relay wireless device 230 via a communication interface 233. Communication interface 233 may be any interface that enables direct communication between relay wireless device 230 and small cell 231, such as USB, FireWire, Ethernet, or any other serial, parallel, analog, or digital interface. Small cell 231 is illustrated as comprising an antenna 255 for wireless communication with wireless devices 240, a transceiver 256, a processor 257, and a memory 258 for storing instructions that enable small cell 231 to perform operations described herein. In some embodiments, small cell 231 may be a Home eNodeB. Moreover, although only one transceiver is depicted in each of relay wireless device 230 and small cell 231, additional transceivers may be incorporated in order to facilitate communication across interface 233 and other network elements.

In operation, relay wireless device 230 relays network services from access node 210 to wireless devices 240 via small cell 231. Relay wireless device 230 may begin to function as a relay by sending a message to access node 210 to indicate to access node 210 that relay wireless device 230 is functioning as a relay wireless device. Access node 210 may consequently alter how relay wireless device 230 is assigned resources. In some embodiments, relay wireless device 230 can request to send a buffer status report to access node 210. Access node 210 can grant this request in a conventional manner. Relay wireless device 230 may respond to the grant by sending a short buffer status report. This short buffer status report is associated with a logical channel group that indicates the buffer status report is communicating the status of the UE as a relay, and thus is not asking for additional resource allocations (like a 'conventional' buffer status report would indicate). In other words, when a UE responds with a buffer status report for a predetermined logical channel group, it indicates that the UE is functioning as a relay rather than serving as a conventional buffer status report. Once status of relay wireless device 230 is established, relay wireless device 230 may instruct small cell 231 to start accepting connection requests from one or more of wireless devices 240.

Figure 3:
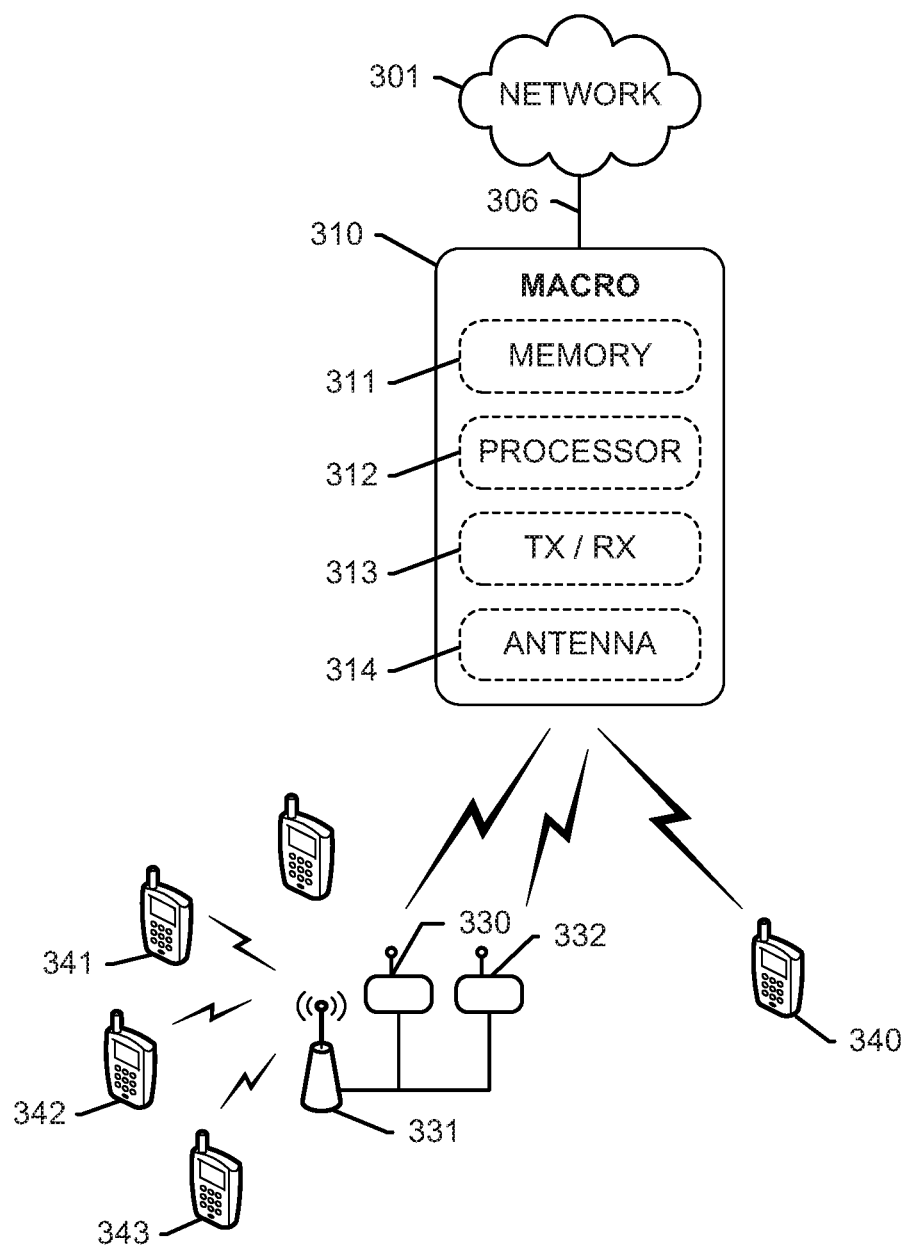
FIG. 3 depicts an exemplary access node.

FIG. 3 depicts an exemplary access node 310 which may comprise, for example, a macro access node. As described herein, access node 310 provides access to network services from network 301 to wireless devices 340, 341, 342, 343, which may comprise end-user wireless devices, either directly, or via relay wireless device 330 and small cell 331. In this embodiment, access node 310 is illustrated as being in communication with network 301 via communication link 306, and comprising a memory 311 for storing instructions that enable access node 310 to perform operations described herein. Further, access node 310 comprises a processor 312 for executing operations, and a transceiver 313 coupled to an antenna 314 for wireless communication with one or more wireless devices, such as end-user wireless device 340, or relay wireless device 330. Further, communication link 306 may be any interface that enables communication between access node 310 and network 301, such as an S1 interface. In some embodiments, access node 310 may be in communication with multiple relay wireless devices connected to small cell 331, such as relay wireless devices 330 and 332. Here, access node 310 provides access to network services from network 301 to end-user wireless devices 340, 341, 342, 343, via relay wireless devices 330 and 332, and small cell 331. Other network nodes such as gateways and controllers may be present but are not shown for purposes of simplicity.

Referring back to FIG. 1, in operation, system 100 may use a plurality of carriers in order to provide wireless communication services. For example, a plurality of carriers that comprise bandwidth for wireless communications (e.g., one or more carriers over a 1.25 GHz spectrum, one or more carriers over a 1900 Mhz spectrum, one or more carriers over a 800 Mhz spectrum, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

Figure 4:
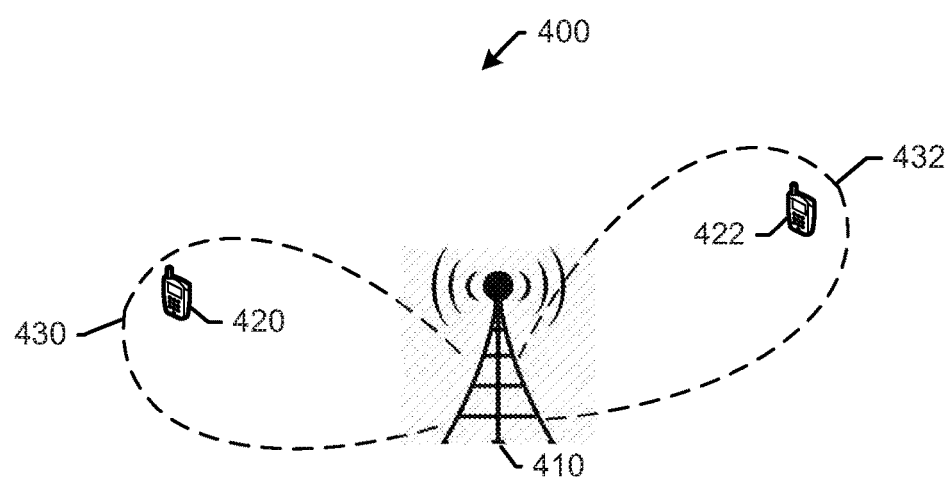
FIG. 4 depicts an illustration of exemplary beamformed signals.

In an embodiment, beamforming may be implemented by the system 100. FIG. 4 illustrates an embodiment of emitting beamformed signals from an access node. For example, beamforming may be accomplished using a plurality of antennas at access node 410 that implement, for example, a multiple input multiple output (MIMO) protocol. The signals from each of the plurality of antennas may be controlled such that the net signal from the access node may be transmitted towards wireless device 420 and 422 as a beamformed signals 430 and 432, respectively. In an embodiment, the beam may be formed by weighing the magnitude and/or phase of the signals transmitted by each individual antenna. For example, the signals may be weighed such that the emitted waveform from the antennas experiences constructive interference in the direction of wireless devices 420 and 422, respectively, and destructive interference in other directions (e.g., away from the wireless devices).

FIG. 4 illustrates beamformed signals 430 and 432 that are narrowed towards the location of wireless devices 420 and 422, respectively. Beamforming may increase the signal quality of a signal received at wireless devices 420 and 422 from access node 410. For example, a channel quality indicator (CQI) for wireless devices 420 and 422 may be increased as a result of beamformed signals 430 and 432. The increased channel quality may enable enhanced wireless services, such as enhanced link reliability, greater data rates for communication, and the like. Returning back to FIG. 1, access node 110 may transmit one or more beamformed signal to wireless devices within coverage area 115 (e.g., wireless devices 140 and 144).

In an embodiment, carrier aggregation may also be implemented by the system 100. For example, access node 110 may communicate with wireless devices over multiple frequency bands using carrier aggregation such that the data rate (or throughput) for the communication is greater than the data rate for single carrier communication. In an embodiment, access node 110 may communicate with a wireless device using a primary carrier (e.g., a first frequency band) and one or more secondary carriers (e.g., one or more secondary frequency bands). For example, a primary channel (e.g., 5 or 10 Mhz channel) and one or more secondary channels may be allocated for communication between access node 110 and a wireless device, where each channel may comprise a component carrier for the communication. When using carrier aggregation, the available spectrum for communication, and thus the data rate or throughput, may increase directly with the number of secondary component carriers. In an embodiment, access node 110 may perform carrier aggregation for one or more wireless devices within coverage area 115 (e.g., wireless devices 142 and 144).

Figure 5:
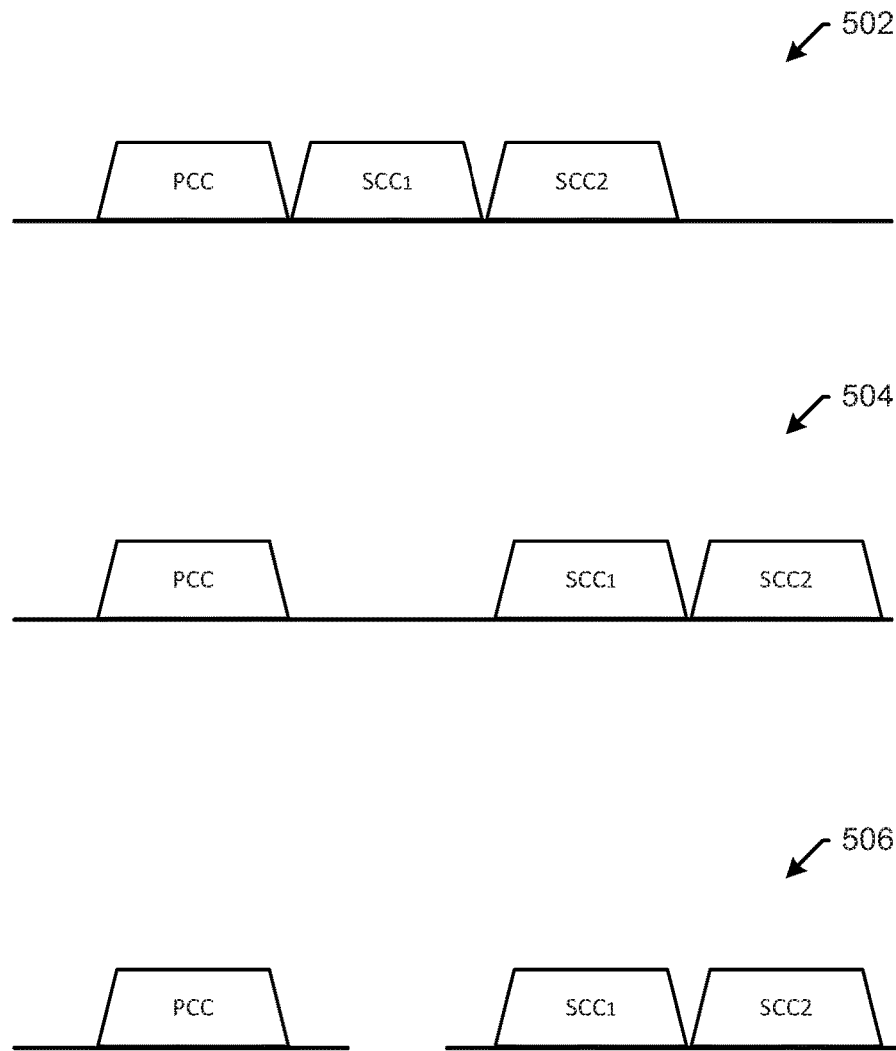
FIG. 5 depicts an illustration of exemplary carrier aggregation.

In an embodiment, the communication may leverage one or more of intra-band carrier aggregation with contiguous component carriers, intra-band carrier aggregation with non-contiguous component carriers, or inter-band carrier aggregation. FIG. 5 illustrates various configurations for carrier aggregation according to embodiments. Configuration 502 illustrates intra-band carrier aggregation where the assigned primary and secondary carriers are contiguous with one another. Configuration 504 illustrates intra-band carrier aggregation where the assigned primary and secondary carriers are not contiguous with one another, however the carriers are within the same band (e.g., band class or a predetermined block of wireless spectrum). Configuration 506 illustrates inter-band carrier aggregation where the assigned primary and secondary carriers are not contiguous with one another and the primary carrier is not within the same band (e.g., band class or a predetermined block of wireless spectrum) as the secondary carriers.

In some embodiments, as illustrated, one or more relay wireless devices may overlap with coverage area 115 of access node 110, such as relay wireless device 130. Since the relay wireless devices serve as backhaul for one or more small cells (e.g., small cell 131), access node 110 may assign wireless resource in order to communicate with relay wireless device 130. For instance, the relay wireless device may be assigned a frequency band to communicate with access node 110. However, because the relay wireless device serves as backhaul for a small cell, it may consume greater wireless resources than normal wireless device and/or the frequency band assigned to the relay wireless device may be at risk of congestion. In some instances, the small cells served by the relay nodes may experience sudden changes in load, and thus the assigned frequency bands may similarly experience sudden changes in load.

In an embodiment, access node 110 may also communicate with relay wireless device 130 while other wireless devices within coverage area 115 are communicating with the access node using various configurations (e.g., one or more of beamforming and carrier aggregation). Accordingly, it may be beneficial to select a frequency band for relay wireless devices based on congestion parameters. For example, a calculated overhead may be considered when selecting a frequency band to be used for wireless backhaul. In some embodiments, selecting a frequency band for wireless backhaul based on calculated overhead may reduce the risk of congestion and thus enable a more robust backhaul connection.

Figure 6:
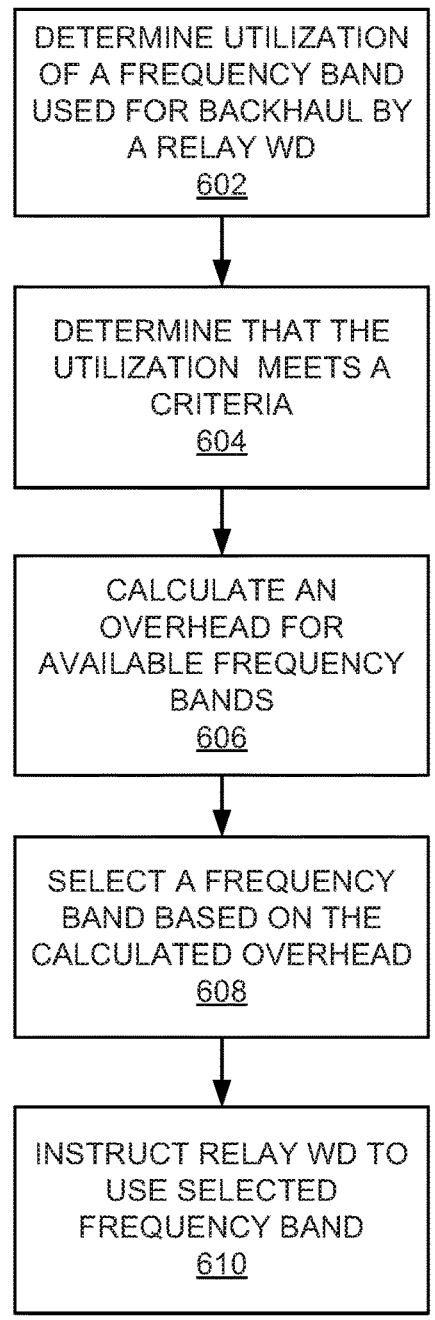
FIG. 6 depicts an exemplary method for determining a frequency band for wireless backhaul.

FIG. 6 illustrates an exemplary method for determining a frequency band for wireless backhaul according to an embodiment. The method will be discussed with reference to the exemplary communication system 100 illustrated in FIG. 1, however, the method can be implemented with any suitable communication system.

Referring to FIG. 6, at step 602, a utilization of a frequency band used for backhaul between a relay wireless device and an access node may be determined. For example, access node 110 and relay wireless device 130 may use an assigned frequency band for backhaul communication, such as backhaul for small cell 131, as described herein.

In an embodiment, the assigned frequency band may be monitored at access node 110 and a utilization for the frequency band may be determined. For example, utilization may comprise one or more of physical resource block (PRB) utilization, a number of Radio Resource Control (RRC) connections, a utilization of the Physical Downlink Shared Channel (PDSCH), a data rate for communication over the frequency band, a combination of these, and any other suitable utilization metric.

In some embodiments, the determined utilization may be based on a number of wireless devices that use the frequency band for carrier aggregation and a number of wireless devices that receive a beamformed transmission over the frequency band. For example, a number of wireless devices that use the frequency band as a primary component carrier for carrier aggregation may be calculated. In another example, a number of wireless devices that receive a beamformed transmission over the frequency band may be calculated. In this example, a utilization of the frequency band may comprise the sum of the number of wireless devices that use the frequency band as a primary component carrier for carrier aggregation and the number of wireless devices that receive a beamformed signal over the frequency band.

In some embodiments, Quality of Service class identifiers (QCIs) may be used to determine the frequency band utilization. A QCI may comprise a set of service requirements for a wireless device. For example, the set of service requirements may include permitted packet delay budget, permitted packet error loss rate, guaranteed or non-guaranteed bit rate, priority, and the like. In addition, some QCIs may permit additional functionality whiles others do not. For example, a subset of QCIs may permit carrier aggregation while the remaining QCIs do not. Similarly, a subset of QCIs may permit beamforming while the remaining QCIs do not. Accordingly, a number of wireless devices that use a frequency band as a primary component carrier for carrier aggregation may be calculated based on the number of wireless devices that communicate over the frequency band with a particular QCI associated with carrier aggregation. Similarly, a number of wireless devices that receive a beamformed transmission over the frequency band may be calculated based on the number of wireless devices that communicate over the frequency band with a particular QCI associated with beamformed transmissions.

At step 604, it may be determined that the utilization of the frequency band used for backhaul between the relay wireless device and the access node meets a criteria. For example, it may be determined that the utilization of the frequency band used for backhaul communication between access node 110 and relay wireless device 130 meets a utilization criteria.

In an embodiment, the utilization criteria may comprise a threshold PRB utilization, a threshold number of RRC connections, a threshold utilization of the PDSCH, a threshold data rate for communication over the frequency band, a combination of these, and any other suitable utilization criteria. In an example where the utilization criteria comprises a threshold, the determined utilization may meet the utilization criteria by meeting or exceeding the threshold.

In an embodiment where the utilization comprises the sum of the number of wireless devices that use the frequency band as a primary component carrier for carrier aggregation and the number of wireless devices that receive a beamformed signal over the frequency band, the criteria may comprise a threshold number of wireless devices. Here, the determined utilization may also meet the utilization criteria by meeting or exceeding the threshold.

At step 606, an overhead may be calculated for a set of frequency bands available for use as backhaul between the relay wireless device and the access node. For example, a set of frequency bands may be available for backhaul communication between access node 110 and relay wireless device 130. In some example, the set of frequency bands available may comprise a subset of all of the frequency bands used for communication at access node 110, where the subset is filtered based on certain criteria. For example, the subset may be filtered based on a minimum bandwidth, maximum number of current RRC connections, and any other suitable criteria.

Figure 7:
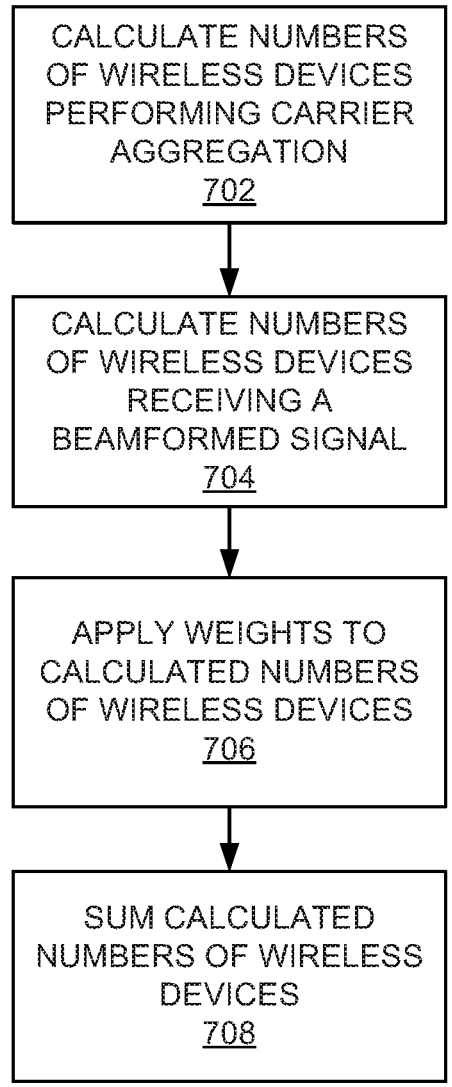
FIG. 7 depicts an exemplary method for calculating overhead for frequency bands.

In an embodiment, an overhead may be calculated for each of the frequency bands available for backhaul communication between access node 110 and wireless device 130 (e.g., each of the subset of frequency bands). In some example, the calculated overhead for a particular one of the set of frequency bands is based on at least one of a number of wireless devices that use the particular frequency band as a primary component carrier for carrier aggregation and a number of wireless devices that receive a beamformed signal over the particular frequency band. FIG. 7 further describes a method for calculating overhead for the set of frequency bands.

At step 608, one of the set of frequency bands may be selected based on the calculated overhead. For example, the frequency band from among the set of frequency bands that comprises the lowest calculated overhead may be selected. In an embodiment where the frequency bands available for communication between access node 110 and relay wireless device 130 comprise a subset of frequency bands used for communication at access node 110, the frequency band from among the subset that comprises the lowest calculated overhead may be selected.

At step 610, the relay wireless device may be instructed to communicate wireless backhaul to the access node over the selected frequency. For example, relay wireless device 130 may be instructed to communicate wireless backhaul to access node 110 over the selected frequency band. Here, the relay wireless device may be instructed to change from an existing frequency band to the selected frequency band to communicate wireless backhaul to access node 110. Thus, after receiving the instruction, relay wireless device 130 may communicate wireless backhaul data (e.g., from small cell 131) to access node 110 over the selected frequency band.

FIG. 7 illustrates an exemplary method for calculating overhead for frequency bands according to an embodiment. The method of FIG. 7 may be implemented together with the method of FIG. 6, for instance at step 606. The method will be discussed with reference to the exemplary communication system 100 illustrated in FIG. 1, however, the method can be implemented with any suitable communication system.

Referring to FIG. 7, at step 702, a number of wireless devices performing carrier aggregation on the set of frequency bands may be calculated. For example, access node 110 and relay wireless device 130 may use an assigned frequency band for backhaul communication, such as backhaul for small cell 131, as described herein. A utilization of the assigned frequency band may meet a criteria, as described herein with reference to FIG. 6. Accordingly, an overhead may be calculated for a set of frequency bands available for backhaul communication between access node 110 and relay wireless device 130. The overhead may be calculated per frequency band and may be based on at least a number of wireless devices using the frequency bands as primary component carriers for carrier aggregation.

For example, for each member of the set of frequency bands, a number of wireless devices performing carrier aggregation on the individual frequency bands may be calculated. In some embodiments, the calculated number of wireless devices may comprise the number of wireless devices that use the individual frequency bands as a primary component carrier for carrier aggregation.

In some embodiments, a subset of QCIs available to be used to communicate with access node 110 may permit carrier aggregation while the remaining QCIs do not. Accordingly, a number of wireless devices that use a frequency band as a primary component carrier for carrier aggregation may be calculated based on the number of wireless devices that communicate over the frequency band with a particular QCI associated with carrier aggregation.

At step 704, a number of wireless devices that receive a beamformed signal over the set of frequency bands may be calculated. For example, for each member of the set of frequency bands, a number of wireless devices that receive a beamformed signal from access node 110 over the individual frequency bands may be calculated.

In some embodiments, a subset of QCIs available to be used to communicate with access node 110 may permit beamformed transmissions. Accordingly, a number of wireless devices that receive a beamformed transmission over a frequency band may be calculated based on the number of wireless devices that communicate over the frequency band with a particular QCI associated with beamforming.

At step 706, weights may be applied to the calculated numbers of wireless devices. For example, a first weight may be applied to the calculated numbers of wireless devices performing carrier aggregation on the individual frequency bands and a second weight may be applied to the calculated numbers of wireless devices receiving a beamformed signal over the individual frequency bands. In some embodiments, the first weight corresponds to an estimated overhead on an individual frequency band caused by a single wireless device that uses the individual frequency band as a primary component carrier for carrier aggregation. Similarly, in some embodiments the second weight corresponds to an estimated overhead on an individual frequency band caused by a single wireless device that receives a beamformed transmission over the individual frequency band.

In an embodiment, applying the first weight may comprise calculating a first product by multiplying the first weight associated with carrier aggregation overhead to the number of wireless devices that use the particular frequency band as a primary component carrier for carrier aggregation. In other words, because in some examples the first weight is determined to be the overhead contributed to a particular frequency band by an individual wireless device using the particular frequency band as a primary component carrier, the product of the first weight and the number of wireless devices using the particular frequency band as a primary component carrier indicates at least an estimate of the overhead caused on the particular frequency band by the wireless devices using the particular frequency band as a primary component carrier.

In an embodiment, applying the second weight may comprise calculating a second product by multiplying the second weight associated with beamforming overhead to the number of wireless devices that receive a beamformed signal over the particular frequency band. In other words, because in some examples the second weight is determined to be the overhead contributed to a particular frequency band by an individual wireless device receiving a beamformed transmission over the particular frequency band, the product of the second weight and the number of wireless devices receiving a beamformed transmission over the particular frequency band indicates at least an estimate of the overhead caused on the particular frequency band by the wireless devices receiving beamformed transmissions.

In some embodiments, the weights may be substantially equal, or may comprise the value "1." In other embodiments, the first weight may be greater than the second weight.

At step 708, the calculated numbers of wireless devices for the set of frequency bands may be summed. For example, the calculated numbers of wireless devices for individual frequency bands among the set of frequency bands may be summed per frequency band.

In an embodiment, the sum may comprise the number of wireless devices that use a particular frequency band as a primary component carrier with the number of wireless devices that receive a beamformed transmission over the particular frequency band. In such an embodiment, weights may not be applied to these calculated numbers. In other embodiments, the sum may comprise the sum of the first product and the second product after the first and second weights have been applied, as calculated in step 706. For instance, the following equation may represent such an embodiment: $Overhead_i = (Carrier\_Agg\_Count_i) \times (Weight_{first}) + (Beamforming\_Count_i) \times (Weight_{second})$, where $Overhead_i$ comprises the estimated overhead calculated for frequency band "i," $Carrier\_Agg\_Count_i$ comprises the calculated number of wireless devices that use frequency band "i" as a primary component carrier for carrier aggregation, $Weight_{first}$ comprises the first weight, as described herein, $Beamforming\_Count_i$ comprises the calculated number of wireless devices that receive a beamformed transmission over frequency band "i," and $Weight_{second}$ comprises the second weight, as described herein. Such an equation may be iterated over for each of the frequency bands of the set of frequency bands available for backhaul communication between access node 110 and relay wireless device 130 until estimated overheads are calculated for the set of frequency bands.

In an embodiment where the method of FIG. 7 is implemented with the method of FIG. 6, the estimated overheads calculated for the set of frequency bands may be used to select one of the set of frequency bands, as described with reference to step 608 of FIG. 6. For example, the frequency band from among the set with the lowest estimated overhead may be selected.

Table 1 illustrates example selections of frequency bands in accordance with various embodiments.

TABLE 1

| Frequency Bands | Current BH | No. WDs using band for CA (primary) | No. WDs using band for BF | Prioritized List | Selected |
|---|---|---|---|---|---|
| F3, F4, F5 | F5 | F3 (10), F4 (3), F5 (0) | F3 (9), F4 (1), F5 (0) | F5, F4, F3 | F5 |
| F3, F4, F5 | F5 | F3 (0), F4 (3), F5 (8) | F3 (1), F4 (3), F5 (7) | F3, F4, F5 | F3 |
| F3, F4, F5 | F5 | F3 (6), F4 (1), F5 (0) | F3 (6), F4 (2), F5 (6) | F4, F5, F3 | F4 |
| F3, F4, F5 | F5 | F3 (3), F4 (1), F5 (2) | F3 (4), F4 (3), F5 (2) | F4, F5, F3 | F4 |

For example, Table 1 lists frequency bands F3, F4, and F5 as available for use for backhaul between a relay wireless device (e.g., relay wireless device 130) and an access node (e.g., access node 110). In each illustrated example, F5 is the currently used frequency band for backhaul communication. Each row of Table 1 illustrates an example where wireless devices perform carrier aggregation (with the identified frequency band as the primary component carrier), beam forming (over the identified frequency band), both of these, or none of these. For instance, row 1 illustrates an example where 10 wireless devices perform carrier aggregation over F3, 3 over F4, and 0 over F5. Similarly, 9 wireless devices receive a beamformed signal using F3, 1 using F4, and 0 using F5. Based on the calculated overhead per frequency band, as described with reference to FIG. 7, a prioritized list may be determined, where the frequency band with the lowest calculated overhead is highest on the prioritized list. Referring back to the example illustrated in row 1, the frequency band with the lowest calculated overhead comprises F5. Because F5 is already used as a backhaul for communication between the relay wireless device and the access node, the backhaul communication remains unchanged.

Rows 2 and 3 implement similar examples, where, based on the calculated overheads for each frequency band, a prioritized list is determined. For the example illustrated in row 2, F3 is selected and for the example illustrated in row 3, F4 is selected. In these two examples, the frequency band used for backhaul may be changed from F5 to F3 and F4, respectively.

While the illustrated examples may be implemented with several embodiments described herein, in one example rows 1, 2, and 3 do not implements weights or implement weights of equal value, as described with reference to FIG. 7. However, in the example illustrated in row 4, the weight applied to the calculated number of wireless devices performing carrier aggregation over a given frequency band may be greater than the weight applied to the calculated number of wireless devices that receive a beamformed signal over a given frequency band. Here, were these weights equal, the overhead calculated between F4 and F5 would be tied. However, because F5 comprises a greater number of wireless devices performing carrier aggregation, the greater weight applied to this number results in a calculated overhead for F5 that is greater than the calculated overhead for F4. Accordingly, F4 is selected based on the lowest calculated overhead between the frequency bands. Various other examples in accordance with the described embodiments may be implemented.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access nodes 110, 310, relay wireless devices 130, 230, gateways 102, and/or network 101.

Figure 8:
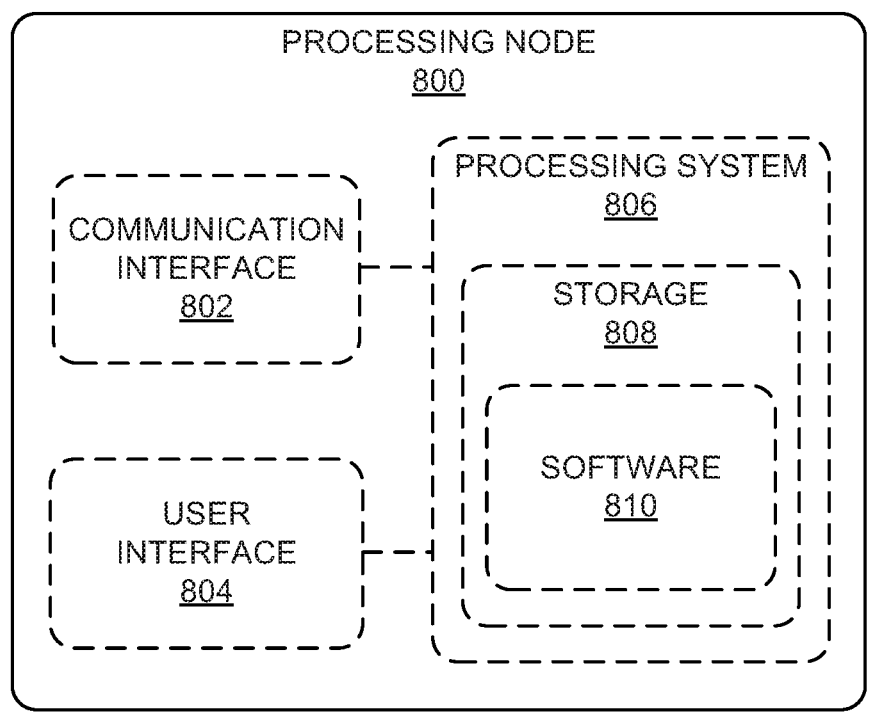
FIG. 8 depicts an exemplary processing node.

FIG. 8 depicts an exemplary processing node 800 comprising communication interface 802, user interface 804, and processing system 806 in communication with communication interface 802 and user interface 804. Processing system 8 includes storage 808, which can comprise a disk drive, flash drive, memory circuitry, or other memory device. Storage 808 can store software 810 which is used in the operation of the processing node 800. Storage 808 may include a disk drive, flash drive, data storage circuitry, or some other memory apparatus. Software 810 may include computer programs, firmware, or some other form of machine-readable instructions, including an operating system, utilities, drivers, network interfaces, applications, or some other type of software. For example, software 810 may include modules for performing the operations described with reference to FIGS. 6 and 7. Processing system 806 may include a microprocessor and other circuitry to retrieve and execute software 810 from storage 808. Processing node 800 may further include other components such as a power management unit, a control interface unit, etc., which are omitted for clarity. Communication interface 802 permits processing node 800 to communicate with other network elements. User interface 804 permits the configuration and control of the operation of processing node 500.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for determining a frequency band for wireless backhaul, the method comprising:
   determining that a utilization of a frequency band used for backhaul between a relay wireless device and an access node meets a criteria;
   calculating overhead for a set of frequency bands available for use as backhaul between the relay wireless device and the access node, wherein the calculated overhead for a particular one of the set of frequency bands is based on at least one of a number of wireless devices that use the particular frequency band for carrier aggregation and a number of wireless devices that receive a beamformed signal over the particular frequency band;
   selecting one of the set of frequency bands based on the calculated overhead; and
   instructing the relay wireless device to communicate wireless backhaul to the access node over the selected frequency band.

2. The method of claim 1, wherein the calculated overhead for the particular one of the set of frequency bands is based on the number of wireless devices that use the particular frequency band as a primary component carrier for carrier aggregation and the number of wireless devices that receive a beamformed signal over the particular frequency band.

3. The method of claim 2, further comprising selecting the frequency band with the lowest calculated overhead.

4. The method of claim 2, wherein calculating overhead for the particular one of the set of frequency bands further comprises:
   calculating a sum of the number of wireless devices that use the particular frequency band as a primary component carrier for carrier aggregation and the number of wireless devices that receive a beamformed signal over the particular frequency band.

5. The method of claim 2, wherein calculating overhead for the particular one of the set of frequency bands further comprises:
   calculating a first product by multiplying a first weight associated with carrier aggregation overhead to the number of wireless devices that use the particular frequency band as a primary component carrier for carrier aggregation;
   calculating a second product by multiplying a second weight associated with beamforming overhead to the number of wireless devices that receive a beamformed signal over the particular frequency band;
   summing the first and second product.

6. The method of claim 5, wherein the first weight corresponds to an estimated overhead on an individual frequency band caused by a single wireless device that uses the individual frequency band as a primary component carrier for carrier aggregation and the second weight corresponds to an estimated overhead on an individual frequency band caused by a single wireless device that receives a beamformed transmission over the individual frequency band.

7. The method of claim 5, wherein the first weight is greater than the second weight.

8. The method of claim 1, further comprising determining a utilization of a frequency band used for backhaul between a relay wireless device and an access node, wherein the utilization is based on a number of wireless devices that use the frequency band for carrier aggregation and a number of wireless devices that receive a beamformed transmission over the frequency band.

9. The method of claim 8, wherein the determined utilization meets the criteria when a sum of the number of wireless devices that use the frequency band for carrier aggregation and the number of wireless devices that receive a beamformed transmission over the frequency band meets or exceeds a threshold.

10. The method of claim 1, further comprises communicating wireless backhaul over the selected frequency band between the relay wireless device and the access node.

11. A system for determining a frequency band for wireless backhaul, the system comprising:
    an access node with a processor configured to:
      determine that a utilization of a frequency band used for backhaul between a relay wireless device and the access node meets a criteria;
      calculate overhead for a set of frequency bands available for use as backhaul between the relay wireless device and the access node, wherein the calculated overhead for a particular one of the set of frequency bands is based on at least one of a number of wireless devices that use the particular frequency band for carrier aggregation and a number of wireless devices that receive a beamformed signal over the particular frequency band;
      select one of the set of frequency bands based on the calculated overhead; and
      instruct the relay wireless device to communicate wireless backhaul to the access node over the selected frequency band.

12. The system of claim 11, wherein the calculated overhead for the particular one of the set of frequency bands is based on the number of wireless devices that use the particular frequency band as a primary component carrier for carrier aggregation and the number of wireless devices that receive a beamformed signal over the particular frequency band.

13. The system of claim 12, wherein the access node is further configured to select the frequency band with the lowest calculated overhead.

14. The system of claim 12, wherein calculating overhead for the particular one of the set of frequency bands further comprises:
    calculating a sum of the number of wireless devices that use the particular frequency band as a primary component carrier for carrier aggregation and the number of wireless devices that receive a beamformed signal over the particular frequency band.

15. The system of claim 12, wherein calculating overhead for the particular one of the set of frequency bands further comprises:
    calculating a first product by multiplying a first weight associated with carrier aggregation overhead to the number of wireless devices that use the particular frequency band as a primary component carrier for carrier aggregation;
    calculating a second product by multiplying a second weight associated with beamforming overhead to the number of wireless devices that receive a beamformed signal over the particular frequency band;
    summing the first and second product.

16. The system of claim 15, wherein the first weight corresponds to an estimated overhead on an individual frequency band caused by a single wireless device that uses the individual frequency band as a primary component carrier for carrier aggregation and the second weight corresponds to an estimated overhead on an individual frequency band caused by a single wireless device that receives a beamformed transmission over the individual frequency band.

17. The system of claim 15, wherein the first weight is greater than the second weight.

18. The system of claim 11, wherein the access node is further configured to determine a utilization of a frequency band used for backhaul between a relay wireless device and an access node, wherein the utilization is based on a number of wireless devices that use the frequency band for carrier aggregation and a number of wireless devices that receive a beamformed transmission over the frequency band.

19. The system of claim 18, wherein the determined utilization meets the criteria when a sum of the number of wireless devices that use the frequency band for carrier aggregation and the number of wireless devices that receive a beamformed transmission over the frequency band meets or exceeds a threshold.

20. The system of claim 11, wherein the access node is further configured to communicate wireless backhaul over the selected frequency band between the relay wireless device and the access node.

* * * * *